United States Patent Office 3,511,863
Patented May 12, 1970

3,511,863
PROCESS FOR THE PRODUCTION OF BIS-(π-ALLYL)-NICKEL COMPOUNDS
Gunther Wilke and Borislav Bogdanovic, Mulheim (Ruhr), Udo Birkenstock, Schneppershof, and Horst Pauling, Mulheim (Ruhr), Germany, assignors to Studiengesellschaft, Kohle m.b.H., Mulheim (Ruhr), Germany
No Drawing. Filed Aug. 11, 1967, Ser. No. 659,892
Claims priority, application Germany, Aug. 16, 1966, St 25,759; Aug. 2, 1967, St 27,207
Int. Cl. C07f 15/04
U.S. Cl. 260—439      13 Claims

ABSTRACT OF THE DISCLOSURE

Preparation of bis-(π-allyl)-nickel compounds by the reaction of π-allyl-nickel-X compounds or complex compounds thereof with Lewis acids with ammonia, amine, imine, hydroxyl amine, water and/or an alcohol disproportioning agent. The X in the above recited compounds stands for chlorine, bromine, iodine, an enolate ion of a 1,3-diketone, an organic carboxylate ion or an alcoholate.

---

This invention relates to a process for the production of bis-(π-allyl)-nickel compounds.

German published patent application 1,190,939 discloses a process in which bis-(π-allyl) compounds of nickel are prepared by allowing allyl compounds of main group metals or of metals of sub-group II of the Periodic Table to act on compounds of divalent nickel. In particular, the corresponding Grignard compounds are used in the process mentioned above. Moreover, it is known from German Pat. 1,194,417 that π-allyl nickel halides can be prepared by reaction of complexes of zero-valent nickel (nickel (0)) with allyl halides. The pure olefin complexes of zero-valent nickel which much may be prepared according to German Pat. 1,191,375 have been found to be particularly suitable for this reaction.

It is possible on principle by further reaction with metal allyl compounds to prepare bis-(π-allyl) compounds from the π-allyl nickel halides which are preparable by the known processes. However, in many cases, difficulties are already encountered by the synthesis of the allyl compounds of the main group metals mentioned above.

It is an object of the present invention to provide a process for the production of bis-(π-allyl)-nickel compounds by reacting π-allyl-nickel-X compounds with disproportioning agents.

It has been found that, for example, it is possible to convert the readily obtainable π-allyl nickel halides, e.g. by reaction with ammonia in the sense of a disproportionation according to the following equation, into bis-(π-allyl) compounds of nickel and ammoniacates of nickel(II) salts.

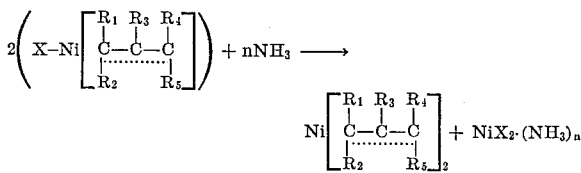

Herein, n is the number of ammonia molecules combined in the resultant ammoniacates and may vary between 1 and 6

Amines such as primary amines, e.g. methylamine, ethylamine, propylamine, secondary amines such as aziridine, dimethylamine, and diamines such as ethylene diamine may also be used for the disproportionation.

Tertiary amines, imines, ethanolamine, hydroxylamine and the like may also be used.

It has also been found that π-allyl-nickel-X compounds disproportion also by reaction with compounds containing hydroxyl groups such as water, monohydric and polyhydric alcohols such as methanol, ethanol, propanol, glycol, glycerol, erythritol, cyclohexanol, etc., to form bis-(π-allyl)-nickel compounds. Suitable disproportioning agents include primary and secondary alcohols, and also tertiary alcohols. The disproportionation proceeds according to the following general equation:

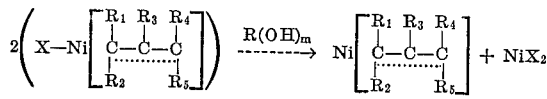

In the equations shown above, $R_1$ to $R_5$ stand for H, alkyl, cycloalkyl, alkenyl, cycloalkenyl, aralkyl and/or aryl radicals. Examples include methyl, ethyl, propyl, butyl, 2-ethylhexyl, dodecyl, pentenyl, octenyl, cyclopentyl, cyclohexyl, phenyl, tolyl, etc. The radicals may also form together the ring, e.g. $R_1$ with $R_2$, $R_3$, $R_4$ or $R_5$; $R_3$ with $R_4$ or $R_5$. For example, ring closure of $R_1$ and $R_2$, respectively, with $R_4$ and $R_5$, respectively, corresponds to the cyclooctenyl radical. It is also possible that 2-π-allyl groups are connected through saturated or unsaturated hydrocarbon chains which then correspond to $R_1$ or $R_4$ and $R_2$ or $R_5$, respectively. X in the formula shown above stands for Cl, Br or I or a complex anion of the halogen atoms with Lewis acids, e.g.

$$Cl^- + AlCl_3 = AlCl_4^-$$

However, X may also stand for an enolate ion of a 1,3-diketone or a carboxylate ion of organic carboxylic acids and for an alcoholate group. If X does no stand for halogen, the π-allyl-nickel-X compounds undergoing disproportionation are generally obtained by substitution from the π-allyl-nickel halides.

The disproportioning agents used in accordance with the invention form complexes with the resulting $NiX_2$ compounds.

The process of the invention is carried out by dissolving or suspending the π-allyl-nickel-X compound in an organic solvent and then reacting it with the disproportioning agent or by reacting the π-allyl-nickel-X compound directly with the disproportioning agent in the absence of additional solvents. For example, when introducing gaseous ammonia during the disproportionation, insoluble ammoniacates of the nickel(II) salts and the soluble bis-(π-allyl) compounds are generally formed.

Processing of the reaction products is extremely simple.

The bis-(π-allyl) nickel compounds formed by disproportionation are subsequently separated from the disproportioning agent and the $NiX_2$ compounds or $NiX_2$ complex compounds either by extraction or by sublimation or by distillation.

For example, the insoluble ammoniacates of the nickel(II) salts are removed by filtration. The bis-(π-allyl) compounds of nickel can be isolated without any difficulty from the halogen-free solutions obtained after the reaction by distillation, sublimation or crystallization.

Suitable solvents include dialkyl, aralkyl and diaryl ethers and cyclic ethers, aliphatic, cycloaliphatic and aromatic as well as halogenated aliphatic and aromatic hydrocarbons. The reaction may also be carried out without a solvent, e.g. in liquid ammonia. Disproportionation occurs also when aqueous solutions of ammonia are allowed to act on π-allyl-nickel-X compounds. In this case, the bis-(π-allyl) compounds formed must be extracted with the solvents mentioned above.

The process of the invention is generally carried out at atmospheric pressure. However, when using liquid ammonia, superatmospheric pressures may also be used.

Disproportionation may also be carried out at subatmospheric pressures, especially if solvents are not used so that, if readily volatile bis-($\pi$-allyl) compounds are formed, the latter may be removed immediately from the reaction mixture by distillation.

The disproportionation is carried out in the temperature range of from $-80°$ to $+100°$ C. and preferably at temperatures of from $-35°$ to $+20°$ C.

An excess of disproportioning agent is generally used.

The process of the invention is of particular commercial importance because it permits the preparation of bis-($\pi$-allyl) compounds of nickel without the use of allyl compounds of the main group metals or of metals of sub-group II of the Periodic Table, the preparation of which offers difficulties in many cases. Moreover, the new process offers the possibility to regenerate catalysts which are used according to Belgian Pat. 651,596 for the oligomerization and polymerization of olefins. For example, in this sense, addition products of, for example, $\pi$-allyl nickel chloride to $AlCl_3$ or alkyl or aryl aluminum halides react with $NH_3$ according to the following equation with disproportation:

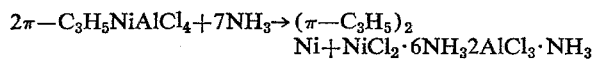

and a $NiCl_2$ ammoniacate and a $AlCl_3$ ammoniacate precipitate as insoluble products while the soluble bis-($\pi$-allyl) nickel is readily separated.

The nickel catalysts of Belgian Pat. 651,596 are regenerated in a similar manner with the other disproportioning agents mentioned such as water, amines, alcohols, etc.

According to the process of the invention, bis-($\pi$-allyl)-nickel compounds are obtained in yields of about 70% to almost 100%.

EXAMPLE 1

566.9 milligrams=3.16 mmoles of $\pi$-allyl nickel bromide are suspended in 10 ml. of ether at $-78°$ C. under argon. Gaseous ammonia dried over KOH is introduced into the deep red mixture for 15 minutes at $-35°$ C. while stirring. The mixture turns instantaneously yellow with formation of a fine precipitate. After 30 minutes, all of the volatile constituents are distilled off at room temperature under a high vacuum and collected in a trap which is cooled with liquid nitrogen. The condensate is free from halogen. In addition to ether and ammonia, it contains bis-$\pi$-allyl nickel from which ether and ammonia are distilled off at $-78°$ C. and $10^{-4}$ mm. Hg. Analysis shows that the residue contains 90.6 mg.=1.54 mg.-atoms of nickel=97.5% of the theory in the form of bis-$\pi$-allyl nickel. The residue of the first distillation contains 94.5 mg.=1.61 mg.-atoms of nickel=102% of the theory in the form of $NiBr_2 \cdot 6NH_3$.

EXAMPLE 2

17.15 grams=47.7 mmoles of $\pi$-allyl nickel bromide are suspended in 300 ml. of ether. Dry ammonia is introduced at $-40°$ C. until the color turns from red to yellow. Bis-$\pi$-allyl nickel and ether are distilled under high vacuum and $NiBr_2 \cdot 6NH_3$ remains as the residue. The ether solution of bis-$\pi$-allyl nickel is largely freed from ammonia at $-80°$ C. under high vacuum. To separate the remaining small amount of ammonia, the solution is stirred with 2 g. of $NiCl_2$ for 12 hours at $0°$ C. The solution is decanted from nickel chloride.

The yield of bis-$\pi$-allyl nickel (by determination of nickel in the solution) is 5.9 g. or 88% of the theory. The bis-allyl nickel may be isolated in crystalline form by evaporation of the ether at $-80°$ C. under high vacuum.

EXAMPLE 3

In the manner described in Example 2, a solution of 1.7 g. of bis-$\pi$-crotyl nickel, i.e. 82% of the theory, is obtained from 4.8 g.=12.4 mmoles of $\pi$-crotyl nickel bromide in 200 ml. of ether with ammonia and by subsequent distillation.

EXAMPLE 4

916.4 mg.=5.10 mmoles of $\pi$-allyl nickel bromide+1,-360 mg.=5.10 mmoles of $AlBr_3$ are dissolved in 50 ml. of chlorobenzene and saturated with gaseous ammonia at $-30°$ C. under argon while stirring. In doing so, a precipitate is formed and the reaction mixture turns yellow. The reaction is completed after 1.5 hours. All volatile constituents are removed from the precipitate at $+20°$ C. and $10^{-4}$ mm. Hg and collected in a trap which is cooled with liquid nitrogen. The condensate is free from halogen and contains 1.75 mmoles of nickel in the form of bis-$\pi$-allyl nickel=72.5% of theory.

EXAMPLE 5

$\pi$-Allyl nickel acetyl acetonate (1,820 mg.=9.15 mmoles) is dissolved in 100 ml. of ether at $-30°$ C. under argon. Thereafter, gaseous ammonia is introduced while stirring until the solution is saturated. The solution which is initially black-brown turns instantaneously yellow while a free precipitate is formed. The precipitate is collected at $0°$ C. on a $G_3$ frit and washed with ether until the effluent is colorless. The insoluble ammoniacate of nickel acetyl acetonate (4.5 mmoles=98.5% of the theory) remains as residue. The dark yellow mother liquor is evaporated to dryness at $-78°$ C. and $10^{-4}$ mm. Hg and the yellow residue is sublimed to give 4 mmoles of bis-$\pi$-allyl nickel, i.e. 88% of the theory.

EXAMPLE 6

$\pi$-Allyl nickel acetyl acetonate (1.34 g.=6.7 mmoles) is suspended in 30 ml. of chlorobenzene and mixed with 2.0 ml.=38.7 mmoles of aziridine at $-30°$ C. In doing so, the color of the reaction mixture turns from black-brown to light yellow while the insoluble

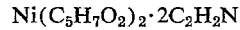

is formed. Insoluble material is separated by filtration, which is followed by washing with chlorobenzene. In the filtrate, 3.1 mmoles of bis-($\pi$-allyl) nickel corresponding to 91.0% of the theory are obtained in the filtrate.

EXAMPLE 7

$\pi$-Allyl nickel chloride (3.89 g.=28.9 mmoles) is suspended in 300 ml. of ether and mixed with 50 ml. of liquid methylamine at $-30°$ C. While the temperature of the reaction mixture increases to $0°$ C., its color changes slowly from brown-red to yellow while a precipitate is formed. Filtration and subsequent distillation of the filtrate under high vacuum gives 11.5 mmoles of bis-($\pi$-allyl) nickel corresponding to 80% of the theory.

EXAMPLE 8

In the manner described in Example 2, $\pi$-(1-vinylallyl)-nickel chloride is quantitatively converted with ammonia in ether at $-80°$ C. into bis-($\pi$-1-vinylallyl)-nickel.

EXAMPLE 9

13.0 grams=47.3 mmoles of bis-cycloocta-(1,5)-diene-nickel (0) are converted into the following complex (I) by the action of liquid butadiene:

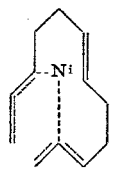

and subsequently reacted with gaseous hydrogen chloride according to German Pat. 1,197,453 to form $\pi$-allyl nickel halide (II):

(II) 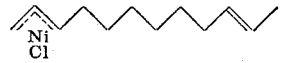

(II) reacts in an ether suspension with liquid ammonia at −40° C. and the color of the reaction mixture changes from brown to light yellow. In this reaction, insoluble $NiCl_2 \cdot 6NH_3$ is precipitated. Filtration gives a halogen-free nickel-containing solution which contains a bis-π-allyl nickel compound having the empirical formula $C_{24}H_{38}Ni$. The solution contains 20 mmoles of nickel corresponding to 84% of the theory.

EXAMPLE 10

By the procedure described in Example 5, π-methallyl-nickel acetyl acetonate in pentane is converted into bis-(π-methallyl)nickel by the action of ammonia. The yield is 70% of the theory.

EXAMPLE 11

By the procedure described in Example 2, 3.623 g.=24.3 mmoles of π-methallyl nickel chloride are dissolved in 100 ml. of ether and treated with ammonia. Subsequent distillation gives a condensate which contains 10 mmoles of bis-(π-allyl)-nickel, the yield being 82.3% of the theoretical.

EXAMPLE 12

315.9 milligrams=2.33 mmoles of π-allyl-nickel aziridide and 593.0 mg.=2.23 mmoles of $AlBr_3$ are reacted in 60 ml. of chlorobenzene at a temperature of −40° C. Processing by the procedure described in Example 11 gives a distillate which contains 0.78 mmole of bis-(π-allyl)-nickel. Yield, 68% of theory.

EXAMPLE 13

By the procedure described in Example 2, π-allyl-nickel bromide is converted with ammonia in both chlorobenzene and pentane to give bis-(π-allyl)-nickel in yields of 90 to 100%.

EXAMPLE 14

Disproportionation by means of water

To 4.54 g. of π-allyl nickel bromide are added 250 ml. of pentane and then 25 ml. of deaerated distilled water. After intensive stirring for about 2 minutes, any undissolved π-allyl nickel bromide has disappeared. The pentane phase has a yellow-orange color and is completely halogen-free. The aqueous phase is solidified by cooling to about −20° C. and subsequently freed from the pentane phase by decanting the latter. The pentane phase is cooled to −75° C. and the pentane distilled under high vacuum into a receiver which is cooled to −150° C. The remaining bis-(π-allyl)-nickel is re-sublimed at 0° C. under high vacuum into a trap cooled to −75° C. and is thus obtained directly in pure form. The yield is 1.64 g. corresponding to 92.5% of the theoretical.

EXAMPLE 15

Disproportionation by means of methanol 2.43 grams of π-allyl nickel bromide are vigorously stirred in 100 ml. of absolute methanol at room temperature for 20 minutes and then the methanol is distilled off at 1–10 mm. Hg. The distilling methanol showing a yellow color contains 0.11 g. of bis(π-allyl)-nickel corresponding to a yield of 11.6% of the theoretical.

EXAMPLE 16

Disproportionation by means of glycol 0.8 gram of π-allyl nickel bromide are mixed with 10 ml. of glycol upon which a layer of 15 ml. of n-pentane is placed. After vigorous stirring for 1 hour, the pentane phase is separated. It contains 50.2 mg. of bis(π-allyl)-nickel corresponding to a yield of 16.3% of the theoretical.

EXAMPLE 17

Disproportionation by means of glycerol 1.3 g. of π-allyl nickel bromide are mixed with 10 ml. of glycerol and a layer of 15 ml. of n-pentane is placed on the mixture. After stirring for 1 hour, the pentane phase is completely free from halogen and is separated. It contains 78 mg. of bis(π-allyl)nickel corresponding to a yield of 15.4% of the theoretical.

What we claim is:

1. Process of preparing bis-(π-allyl)-nickel compounds which comprises reacting a compound selected from the group consisting of π-allyl-nickel-X compounds and π-allyl- nickel- X- Lewis acid complex compounds with at least one disproportioning agent selected from the group consisting of ammonia, amine, imine, hydroxyl amine, water, and alcohol, wherein X is a member selected from the group consisting of chlorine, bromine, iodine, an enolate ion of a 1,3-diketone, an organic carboxylate ion and an alcoholate.

2. Process according to claim 1, wherein the disproportioning agents are selected from the group consisting of primary amines, secondary amines, diamines, primary alcohols, secondary alcohols, monohydric alcohols and polyhydric alcohols.

3. Process according to claim 2, wherein the disproportioning agents are selected from the group consisting of methylamine, ethylamine, propylamine, aziridine, dimethylamine, ethylenediamine, ethanolamine, methanol, ethanol, propanol, glycol, glycerin, erithritol and cyclohexanol.

4. Process according to claim 1, wherein the disproportionation is carried out in additional solvents.

5. Process according to claim 4, wherein the solvents are selected from the group consisting of dialkyl ethers, aralkyl ethers, diaryl ethers, cyclic ethers, aliphatic, cycloaliphatic, aromatic, halogenated aliphatic and halogenated aromatic hydrocarbons.

6. Process according to claim 1 which comprises using the disproportioning agent in excess.

7. Process according to claim 1 wherein the disproportioning agent is liquid ammonia.

8. Process according to claim 7, wherein the disproportionation is carried out under pressure.

9. Process according to claim 1, wherein the disproportionation is carried out under reduced pressure.

10. Process according to claim 9, wherein the disproportionation is carried out without additional solvents.

11. Process according to claim 1, wherein the disproportionation is carried out at temperatures from −80° C. to +100° C.

12. Process according to claim 11, wherein the disproportionation is carried out at temperatures from −35° C. to +20° C.

13. Process according to claim 1 which comprises separating the formed bis-(π-allyl)-nickel-compounds by means of extraction, sublimation or distillation.

References Cited

Hüttel et al., Angew. Chem. 71 (1959) p. 456.

HELEN M. McCARTHY, Primary Examiner

A. P. DEMERS, Assistant Examiner

U.S. Cl. X.R.

260—239

UNITED STATES PATENT OFFICE
CERTIFICATE OF CORRECTION

Patent No. 3511863           Dated May 12, 1970

Inventor(s)  Guenther Wilke et al.

It is certified that error appears in the above-identified patent and that said Letters Patent are hereby corrected as shown below:

Column 2, line 34    (Spec. line 22)

"no" should be --not--

Column 4,

Formula     (Spec. p. 10)

" 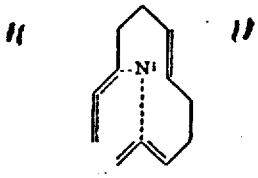 "     should be   -- 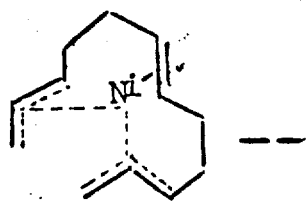 --

SIGNED AND SEALED
DEC 8 1970

(SEAL)
Attest:

Edward M. Fletcher, Jr.
Attesting Officer

WILLIAM E. SCHUYLER, JR.
Commissioner of Patents